United States Patent
Thangamariappan et al.

(12) 
(10) Patent No.: US 12,173,548 B2
(45) Date of Patent: Dec. 24, 2024

(54) WINDOW ASSEMBLY, VEHICLE DOOR, AND VEHICLE

(71) Applicant: Volvo Truck Corporation, Gothenburg (SE)

(72) Inventors: Balaganesh Thangamariappan, Karnataka (IN); Rajaraman Swaminathan, Karnataka (IN)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 18/360,557

(22) Filed: Jul. 27, 2023

(65) Prior Publication Data

US 2024/0060354 A1     Feb. 22, 2024

(30) Foreign Application Priority Data

Aug. 18, 2022   (EP) .................................. 22191036

(51) Int. Cl.
*E05F 15/689*   (2015.01)
*B60J 5/04*   (2006.01)

(52) U.S. Cl.
CPC .......... *E05F 15/689* (2015.01); *B60J 5/0402* (2013.01); *E05Y 2201/434* (2013.01); *E05Y 2900/55* (2013.01)

(58) Field of Classification Search
CPC ..... E05F 15/689; E05F 15/697; B60J 5/0402; E05Y 2201/434; E05Y 2201/438; E05Y 2201/442; E05Y 2201/684; E05Y 2201/696; E05Y 2201/70; E05Y 2201/702; E05Y 2900/55; E05Y 2900/516; E05Y 2600/41; E05Y 2800/232; E05Y 2800/262;

(Continued)

(56) References Cited

U.S. PATENT DOCUMENTS 1,823,237 A *   9/1931   Caesar ....................... B60J 1/20
                                                                160/43
1,835,174 A * 12/1931   Osborne .................. B60J 10/74
                                                                 49/63

(Continued)

FOREIGN PATENT DOCUMENTS

DE      102009006052 A1    9/2010
GB          2509606 A      7/2014

OTHER PUBLICATIONS

European Search Report for European Patent Application No. 22191036, completed Jan. 27, 2023, 3 pages.

*Primary Examiner* — Jerry E Redman
(74) *Attorney, Agent, or Firm* — Withrow & Terranova, PLLC

(57) ABSTRACT

A window assembly for a vehicle, comprising a first drive, comprising a first stator and a first rotor arranged around the first stator; a mobile window, having a transversal edge and a first longitudinal edge and sliding between an open position where the transversal edge is positioned at a first longitudinal end of the first drive and the first longitudinal edge is positioned along the first drive, and a closed position where the transversal edge is positioned at a second longitudinal end of the first drive and where the first longitudinal edge is positioned past the first drive; and a first transmission mechanism, the mobile window being driven by the rotation of the first rotor, via the first transmission mechanism.

9 Claims, 5 Drawing Sheets

(58) Field of Classification Search
CPC ........... E05Y 2800/28; E05Y 2800/296; E05Y 2800/672
USPC ............................... 49/362, 61, 63, 348, 349
See application file for complete search history.

(56) References Cited

U.S. PATENT DOCUMENTS

| | | | | |
|---|---|---|---|---|
| 2,150,829 | A * | 3/1939 | Grishkevich | E05F 11/382 160/90 |
| 4,331,359 | A * | 5/1982 | Sheldon | F41H 5/263 49/63 |
| 4,773,697 | A * | 9/1988 | Svensson | B60J 3/02 49/63 |
| 4,930,255 | A * | 6/1990 | Sea | E05F 15/689 49/63 |
| 5,165,188 | A * | 11/1992 | Tsiros | B60J 3/02 49/63 |
| 5,309,677 | A * | 5/1994 | Kunert | E05F 11/423 49/350 |
| 5,605,013 | A * | 2/1997 | Hogston | E05F 15/71 49/362 |
| 6,415,550 | B1 * | 7/2002 | Fin | E05F 15/689 49/360 |
| 6,430,872 | B1 * | 8/2002 | Fin | B60J 7/0573 49/360 |
| 6,523,880 | B1 * | 2/2003 | Yako | B60J 1/2011 296/97.1 |
| 6,561,568 | B1 * | 5/2003 | Gray | B60R 25/016 296/146.2 |
| 6,655,092 | B2 | 12/2003 | Pacella et al. | |
| 7,603,811 | B2 * | 10/2009 | Renke | E05F 15/697 49/360 |
| 7,806,461 | B2 * | 10/2010 | Patterson | B60J 1/2011 49/63 |
| 7,971,391 | B2 * | 7/2011 | Harie | E05F 15/635 49/362 |
| 8,661,732 | B2 * | 3/2014 | Kong | E05B 83/363 49/362 |
| 10,246,928 | B2 * | 4/2019 | Fletcher | E05D 15/22 |
| 10,343,500 | B2 * | 7/2019 | Chander | B60J 1/17 |
| 11,885,170 | B2 * | 1/2024 | Lekar | E05F 15/689 |
| 2002/0092239 | A1 | 7/2002 | Fin | |
| 2003/0025354 | A1 * | 2/2003 | Akintan | B60J 1/17 49/63 |
| 2004/0003544 | A1 * | 1/2004 | Berry | E05F 11/426 49/374 |
| 2004/0226223 | A1 * | 11/2004 | Lubaway | E05F 15/692 49/349 |
| 2007/0261311 | A1 * | 11/2007 | Renke | E05F 15/697 49/349 |
| 2014/0375083 | A1 * | 12/2014 | Tejeda | B60J 1/17 49/404 |
| 2022/0009323 | A1 | 1/2022 | Schmidt et al. | |
| 2024/0060354 | A1 * | 2/2024 | Thangamariappan | E05F 15/689 |

* cited by examiner

WINDOW ASSEMBLY, VEHICLE DOOR, AND VEHICLE

RELATED APPLICATIONS

The present application claims priority to European Patent Application No. 22191036.7, filed on Aug. 18, 2022, and entitled "WINDOW ASSEMBLY, VEHICLE DOOR, AND VEHICLE," which is incorporated herein by reference in its entirety.

TECHNICAL FIELD

The disclosure relates generally to the technical field of vehicle windows. In particular aspects, the disclosure relates to a window assembly for a vehicle, to a vehicle door and to a vehicle.

The disclosure can be applied in heavy-duty vehicles, such as trucks, buses, and construction equipment. Although the disclosure will be described with respect to a particular vehicle, the disclosure is not restricted to any particular vehicle.

BACKGROUND

The cab of known vehicles such as trucks and cars usually includes lateral doors with windows, so that the driver and passengers may see the area outside from the vehicle through the window when sitting inside the vehicle. The window of each door is usually mobile between a closed position and an open position, e.g. for venting the interior of the vehicle. Some vehicles also have fixed windows, for improving the driver and passenger's visibility. However, the surface area of the windows is often limited by the mechanism that drives the mobile window between the open and closed positions. When the mobile window equips a door of the vehicle, available space for arranging windows is limited by the frame structure of the door itself but also by said mechanism, which is usually arranged inside the door, at a bottom part of the door under the mobile window.

SUMMARY

The disclosure proposes to improve a driver's and/or passengers visibility, while still enabling mobility of the window of a vehicle.

An aspect of the disclosure concerns a window assembly for a vehicle, the window assembly comprising a first drive, comprising a first stator and a first rotor, the first rotor being arranged around the first stator for rotating relative to the first stator, about a first longitudinal axis fixed relative to the first stator, when the first drive is electrically powered. The window assembly further comprises a mobile window, having a transversal edge and a first longitudinal edge, the mobile window being configured for sliding relative to the first stator substantially parallel to the first longitudinal axis, between an open position where the transversal edge is positioned at a first longitudinal end of the first drive and the first longitudinal edge is positioned along the first drive, and a closed position where the transversal edge is positioned at a second longitudinal end of the first drive and where the first longitudinal edge is positioned past the first drive along the first longitudinal axis. The window assembly further comprises a first transmission mechanism, the mobile window being driven between the open position and the closed position by the rotation of the first rotor, via the first transmission mechanism. When in use, the first longitudinal axis may substantially be vertical or vertical and the mobile window, when in the closed position, positioned past the first drive in an upward direction parallel to the first longitudinal axis. Hereby a technical effect is that space is available for placing another window, such as a fixed window, beside the first drive, without any element blocking see-through said other window in this area. In turn, the first drive and the first transmission mechanism may easily be arranged along a frame of the window assembly, such as a door frame, considering that the first drive and first transmission mechanism may easily have, overall, an elongated shape along the first longitudinal axis. If the window assembly is installed in a vehicle door, the first drive may advantageously be arranged along an edge of the door, parallel to the first longitudinal axis, leaving most of the door available for placing the windows. The mobile window may be superposed with said other window when in the open position, still enabling see-through the superposed windows. The mobile window may be positioned past said other window when the mobile window is in the closed position, enabling see through the two windows at their respective locations. In other words, the window assembly leaves more available space for more window surface, thereby improving the driver's and/or passenger's visibility. The better visibility may improve safety in maneuvering of the vehicle, in particular if the vehicle is a large ground vehicle such as a truck, a construction vehicle, a mining vehicle, a van, a coach or the like.

In certain examples, the window assembly further comprises a fixed window, fixed relative to the first stator and positioned along the first drive, wherein the mobile window is superposed with the fixed window when the mobile window is in the open position and wherein the mobile window is positioned past the fixed window when the mobile window is in the closed position. Hereby a technical effect is that the fixed window provides more visibility while not being obstructed by any part required for sliding the mobile window. In this case, the window assembly can especially be used for equipping a vehicle door, with the fixed window at the bottom and the mobile window at the top when in the closed position.

In certain examples, the first drive comprises: a first attachment, for attaching the first stator to a frame of the window assembly, the mobile window being mobile relative to the frame between the closed and the open position, the first attachment being positioned at the first longitudinal end of the first drive, and a second attachment, for attaching the first stator to the frame, the second attachment being positioned at a second longitudinal end of the first drive, opposite to the first longitudinal end of the first drive, the first rotor being arranged between the first attachment and the second attachment. Hereby a technical effect is that the first drive may be reliably attached to the frame of the vehicle by both longitudinal ends, while being compact for leaving available space for said other window, in particular fixed window. This arrangement is especially useful if the window assembly is installed in the vehicle door.

In certain examples, the first transmission mechanism comprises a lead screw, arranged around the first rotor and secured to the first rotor, and a nut, secured to the mobile window and geared with the lead screw. Hereby a technical effect is that the transmission mechanism may be packed with the first drive in a compact manner, while being mechanically efficient and easy maintenance.

In certain examples, the first transmission mechanism comprises a slider, attached to the mobile window, and a sliding guide, fixed relative to the first stator, the slider being guided by the sliding guide for guiding the sliding of the mobile window between the open position and the closed position. Hereby a technical effect is to obtain stability and reliability of the sliding movement of the mobile window.

In certain examples, the window assembly further comprises a second drive, comprising a second stator and a second rotor, the second rotor being arranged around the second rotor for rotating relative to the second stator, about a second longitudinal axis fixed relative to the second stator and parallel to the first longitudinal axis, when the second drive is electrically powered, the mobile window having a second longitudinal edge opposite to the first longitudinal edge, the transversal edge connecting the first longitudinal edge to the second longitudinal edge, the transversal edge being positioned at a first longitudinal end of the second drive when the mobile window is in the open position, the second longitudinal edge being positioned along the second drive when the mobile window is in the open position, the second longitudinal edge being positioned past the second drive along the second longitudinal axis when the mobile window is in the closed position. The window assembly may further comprise a second transmission mechanism, the mobile window being driven between the open position and the closed position by rotation of the second rotor, via the second transmission mechanism, in addition to being driven by rotation of the first rotor. Hereby a technical effect is that the first drive and the second drive may be smaller, as their power for moving the mobile window is combined. In embodiments where said other window, e.g. fixed window, is provided, said other window may be placed between the first drive and the second drive. When the mobile window is in the open position, the mobile window is positioned between the first drive and the second drive.

In alternative embodiments, only one drive is provided, e.g. only the first drive and the first transmission mechanism but not the second drive nor the second transmission mechanism. In this alternative embodiment, while the mobile window is driven by the first drive at the first longitudinal edge of the mobile window, a slider and sliding guide may be provided at the second longitudinal edge of the mobile window for guiding the sliding of the mobile window between the open and the closed positions.

Another aspect of the disclosure concerns a vehicle door, comprising the window assembly as defined above.

Another aspect of the disclosure concerns a vehicle, comprising a cab, wherein the cab comprises the window assembly as defined above.

In certain examples, the vehicle is a heavy-duty ground vehicle, such as a truck, a coach, a bus or a van.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

The disclosure proposes to improve a driver's visibility and/or to reduce the flowing of water along an area of a ground vehicle to be avoided, such as a side window of the ground vehicle.

Figure 1:
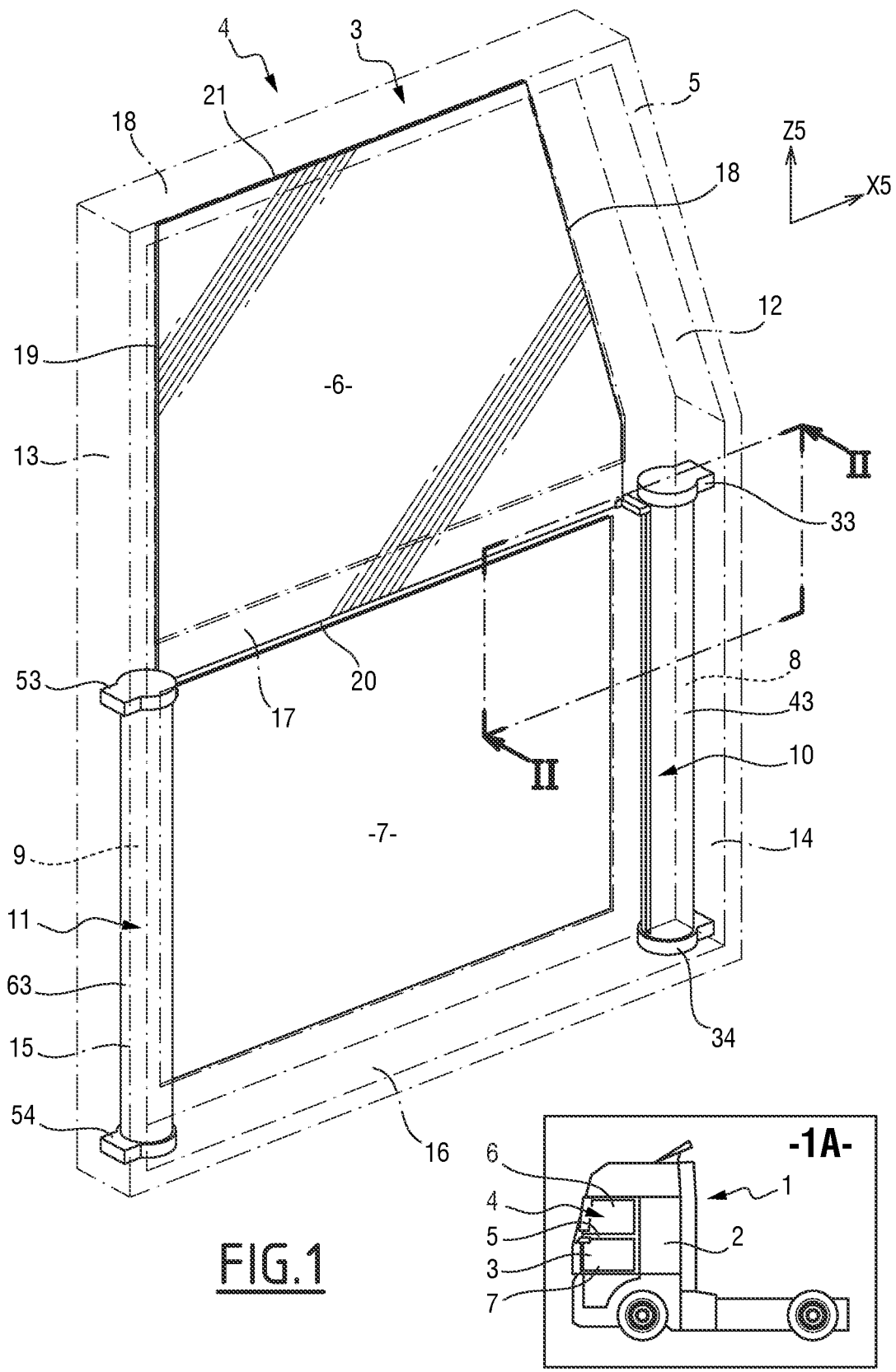
FIG. 1 shows a perspective view of a vehicle door with a window assembly according to one example, where a mobile window is in a closed position, FIG. 1 also showing schematically a vehicle equipped with said door in box 1A.

FIG. 1 shows a ground vehicle 1 in box 1A. The vehicle 1 includes a cab 2 with a window assembly 3, here belonging to a lateral door 4. The window assembly 3 comprises a frame 5, a mobile window 6 and a fixed window 7. The door 4 may be used by a driver and/or a passenger to enter and exit the cab 2. The windows 6 and 7 are transparent so that the driver and/or passenger positioned in the cab 2 may see the surroundings outside of the vehicle 1 through the windows 6 and 7.

The vehicle 1 is here embodied as a truck, i.e. a heavy-duty ground vehicle. However, the vehicle 1 could be another heavy-duty ground vehicle, such as a coach, a bus or a van. The vehicle 1 could even be another type of vehicle that would require a window assembly such as the window assembly 3, including the mobile window 6.

As shown in FIG. 1, the window assembly 3 belongs to the door 4. In other embodiments, instead of belonging to the door 4, the window assembly 3 could belong to a fixed part of a body of the vehicle, belonging to the cab 2.

The door 4, including the window assembly 3, are shown in greater detail in the main view of FIG. 1.

The window assembly 3 comprises the frame 5, the mobile window 6, the fixed window 7, a first drive 8, a second drive 9, a first transmission mechanism 10 and a second transmission mechanism 11.

The window assembly 3 defines a longitudinal direction Z5 and a transversal direction X5, preferably perpendicular to one another, and fixed relative to the frame 5. In use, the longitudinal direction Z5 is preferably oriented upwards, and the transversal direction X5 is preferably oriented substantially horizontally, such as, along the direction of travel of the vehicle 1.

The frame 5 comprises longitudinal pillars 12, 13, 14 and 15, oriented substantially in the longitudinal direction Z5, and transversal beams 16, 17 and 18, oriented substantially in the transversal direction X5. One or more of the pillars 12, 13, 14 and 15 and beams 16, 17 and 18 may be obliquely oriented relative to the directions Z5 and X5, such as, in FIG. 1, the pillar 12. At a first ends thereof, the pillars 12 and 13 are connected by the beam 18. At a second end thereof, the pillars 12 and 13 are connected by the beam 17. At a first ends thereof, the pillars 14 and 15 are connected by the beam 17. At a second end thereof, the pillars 14 and 15 are connected by the beam 16. The second end of the pillar 12 is connected to the first end of the pillar 14, at a first junction with the beam 17. The second end of the pillar 13 is connected to the first end of the pillar 15, at a second junction with the beam 17.

The fixed window 7 is oriented parallel to directions X5 and Z5. The fixed window 7 is fixedly attached to the frame 5. The fixed window 7 is received between the pillars 14 and 15 and the beams 16 and 17.

The mobile window 6 is oriented parallel to directions X5 and Z5, i.e. parallel to the fixed window 7. The mobile window 6 has a first longitudinal edge 18, a second longitudinal edge 19, a first transversal edge 20 and a second transversal edge 21. The edges 18, 19, 20 and 21 delineate the window 6. The longitudinal edges 18 and 19 are opposite and oriented substantially parallel to direction Z5. The transversal edges 20 and 21 are opposite and oriented substantially parallel to direction X5. The edge 20 connects the edges 18 and 19 and the edge 21 connects the edges 18 and 19.

Figure 2:
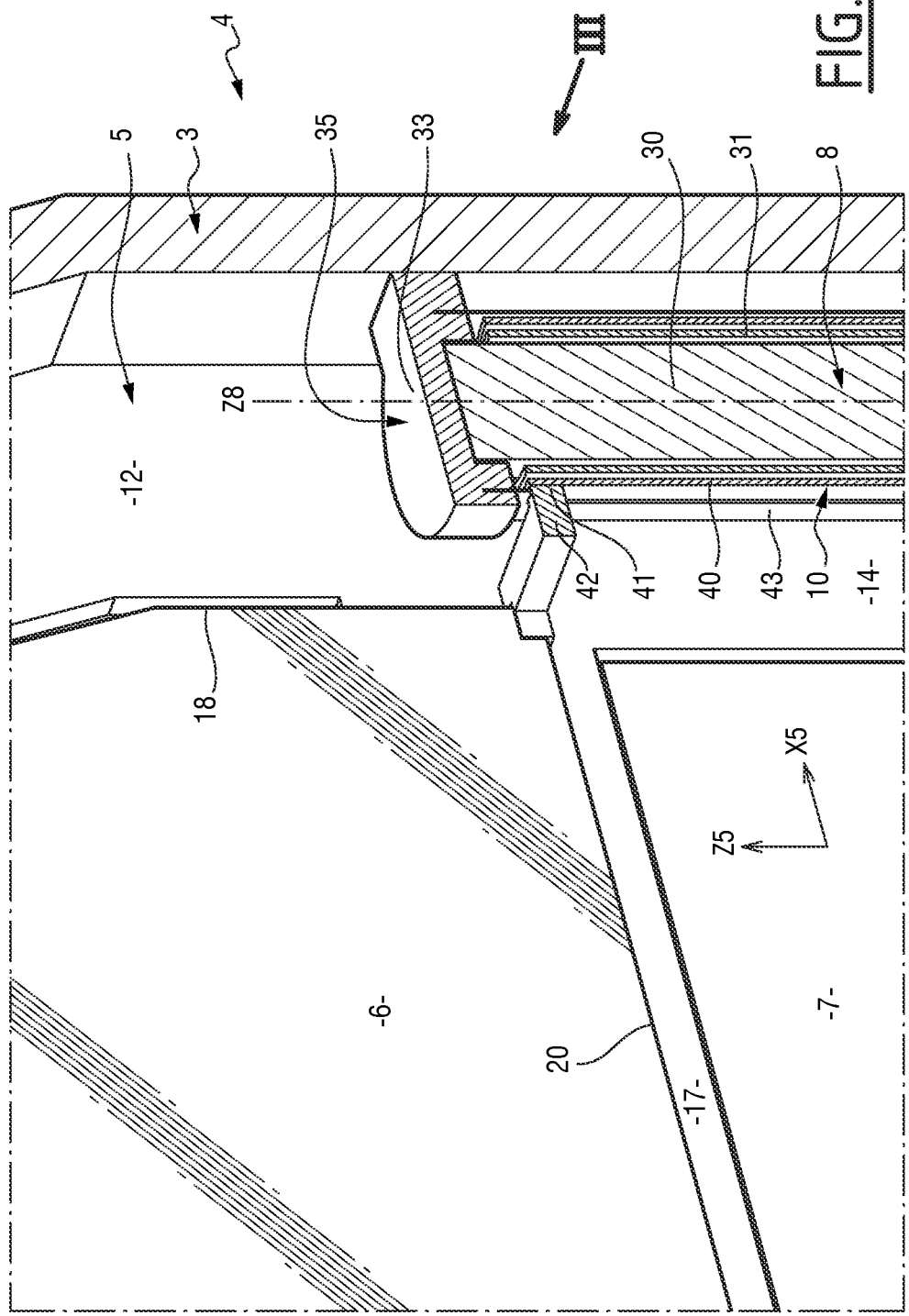
FIG. 2 is a partial perspective cross-sectional view of FIG. 1, as outline in bow II-II of FIG. 1.
Figure 3:
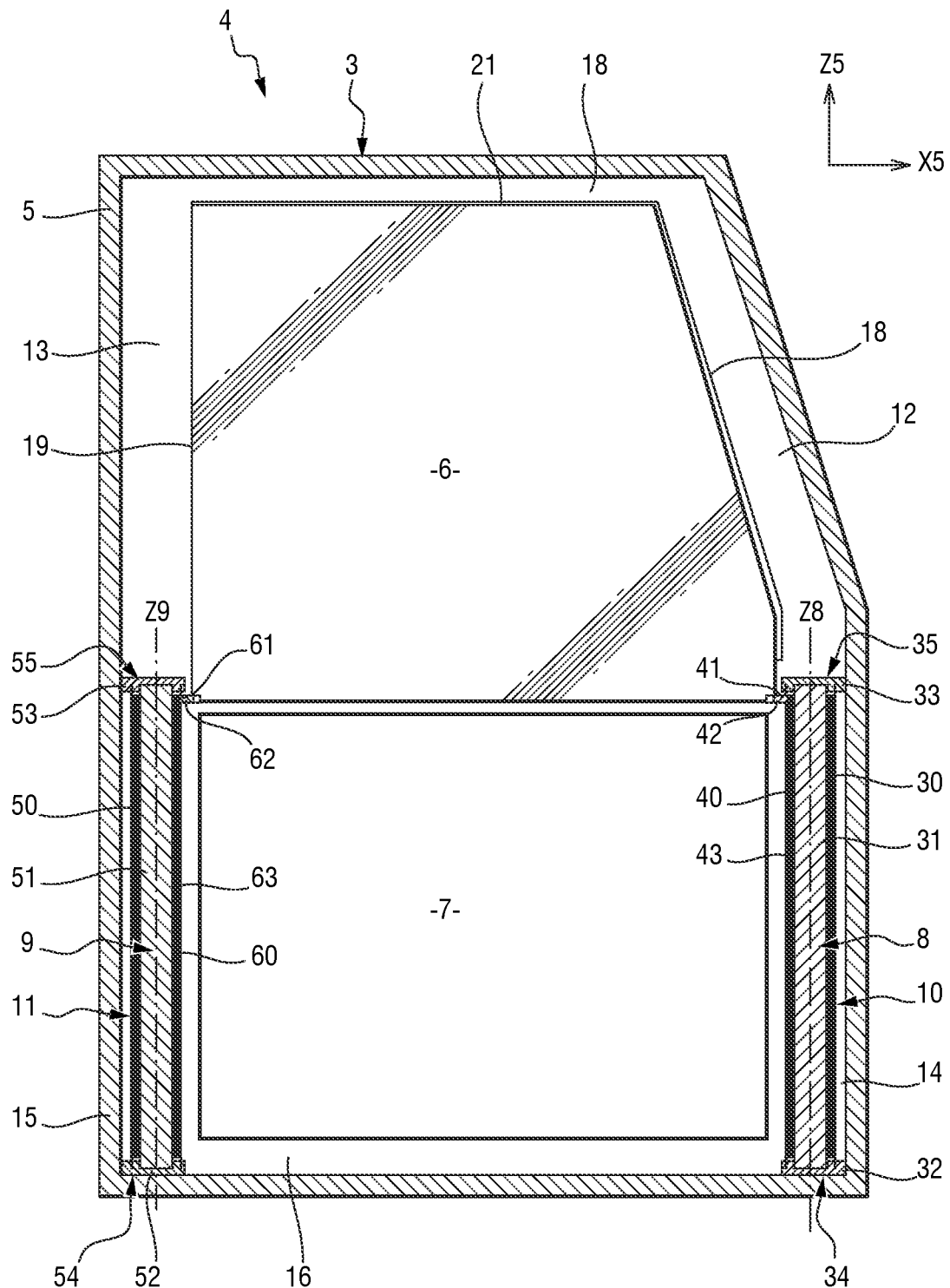
FIG. 3 is a face cross-sectional view similar to FIG. 2, showing the entire vehicle door.
Figure 4:
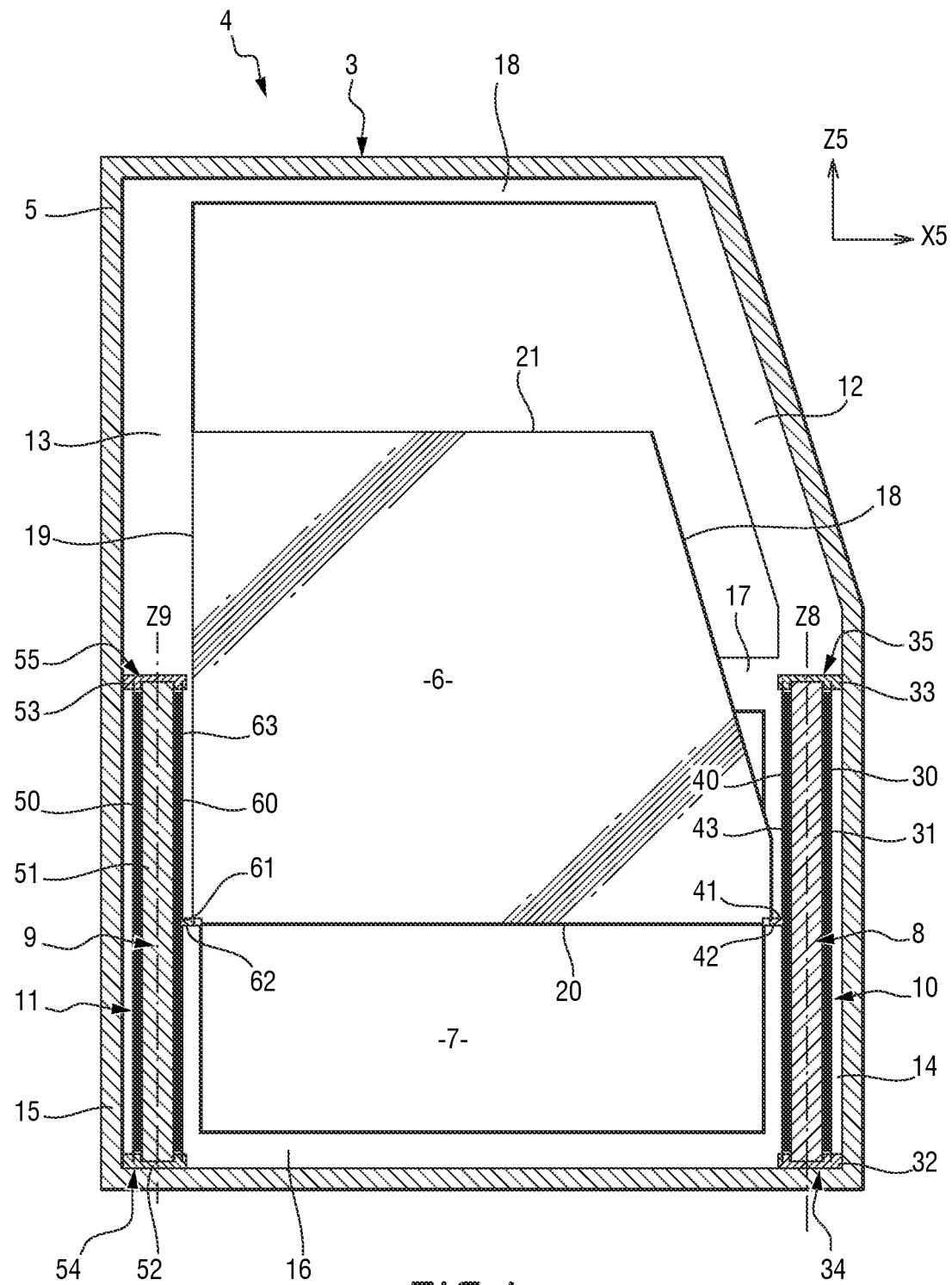
FIG. 4 is a view similar to FIG. 3, where a mobile window is in an intermediate position.
Figure 5:
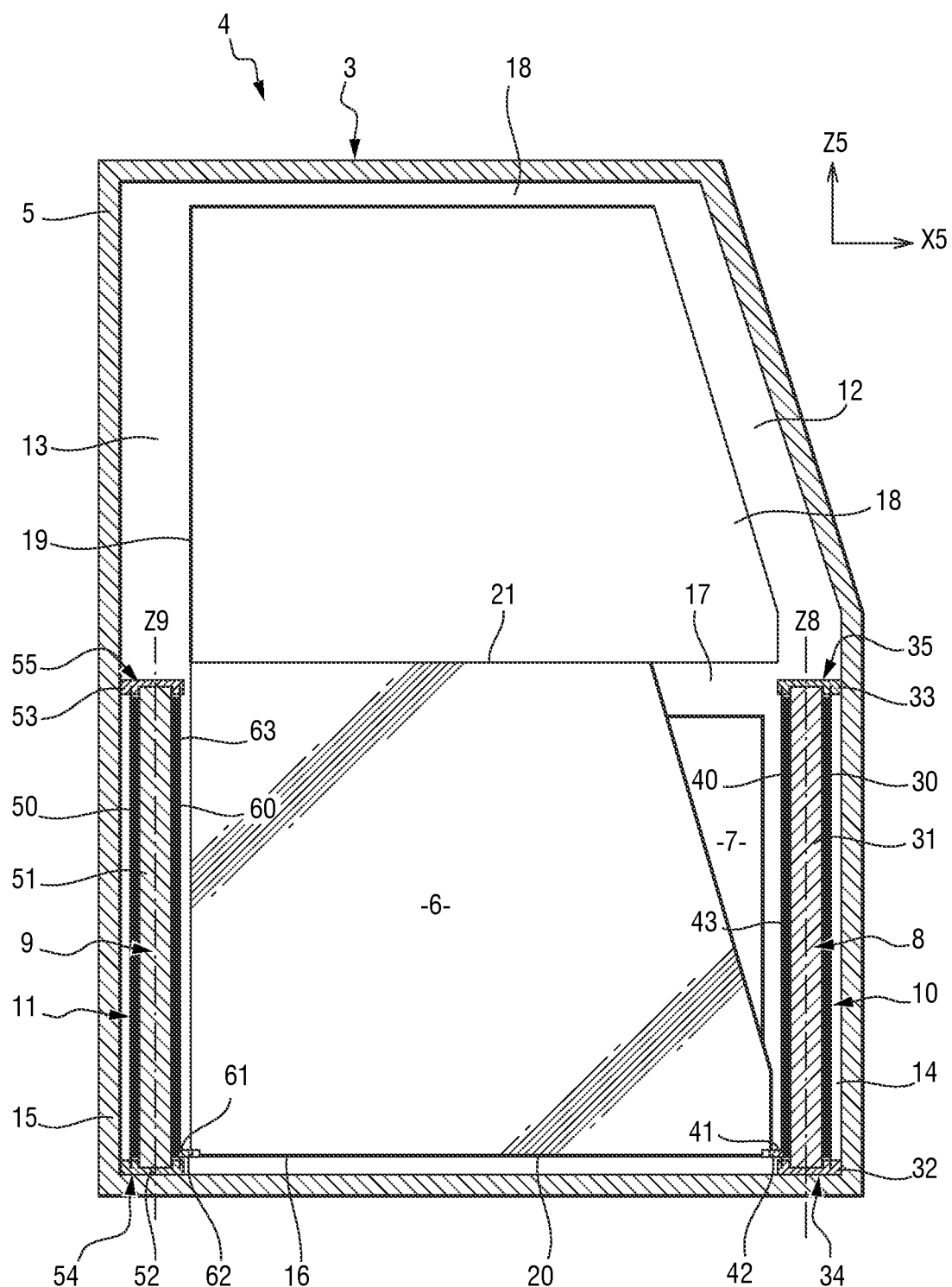
FIG. 5 is a view similar to FIG. 3 and FIG. 4, where a mobile window is in an open position.

The mobile window 6 is mobile relative to the frame 5, by sliding between a closed position shown in FIGS. 1, 2 and 3 and an open position shown in FIG. 5. When sliding from the closed position to the open position, the window 6 is moved in the longitudinal direction Z5, i.e. preferably upwards. When sliding from the open position to the closed position, the window is moved opposite to the longitudinal direction Z5, i.e. preferably downwards. Between the open and closed position, the window 6 reaches an intermediate position shown in FIG. 4.

As visible in FIGS. 1, 2 and 3, when in the closed position, the mobile window 6 is positioned between the beams 17 and 18 and between the pillars 12 and 13. When in the closed position, the mobile window 6 is positioned past the fixed window 7 i.e. is positioned in the direction Z5 relative to the fixed window 7. When in the closed position, the mobile window 6 closes an opening of the frame 5 delineated by the beams 17 and 18 and by the pillars 12 and 13. In this configuration, a driver and/or a passenger positioned in the cab 2 may see the surroundings outside of the vehicle 1 respectively through each window 6 and 7.

As visible in FIG. 5, when in the open position, the mobile window 6 is positioned between the beams 16 and 17 and between the pillars 14 and 15. When in the open position, the mobile window 6 is superposed with the fixed window 7. Thus, a driver and/or a passenger positioned in the cab 2 may see the surroundings outside of the vehicle 1 through the superposed windows 6 and 7. When in the open position, the mobile window 6 leaves open the opening of the frame 5 delineated by the beams 17 and 18 and by the pillars 12 and 13. In this configuration, a driver and/or a passenger positioned in the cab 2 may also see the surroundings outside of the vehicle 1 through the opening of the frame 5 left open by the window 6.

The first drive 8 is contained inside the first transmission mechanism 10. The first drive 8 and transmission mechanism 10 are contained in the pillar 14. As best visible in FIGS. 2-5, the first drive 8 comprises a first rotor 30, a first stator 31, a first attachment 32, a second attachment 33, a first longitudinal end 34 and a second longitudinal end 35. The first drive 8 defines a first longitudinal axis Z8, parallel to the longitudinal direction Z5 and fixed relative to the stator 31 and the frame 5.

The longitudinal end 34 is positioned at the beam 16 and the longitudinal end 35 is positioned at the beam 17.

The first drive 8 may be an electric drive. The stator 31 has an elongated shape along the axis Z8, and extends from the end 34 to the end 35. The stator 31 is fixed relative to the frame 5, and is attached to the frame 5 at the first end 34, by the first attachment 32, and at the second end 35, by the second attachment 33. The first attachment 32 connects the stator 31 to a junction between the beam 16 and the pillar 14. The second attachment 33 connects the stator 31 to a junction between the beam 17 and the pillar 14.

The rotor 30 has a tubular shape centered on the axis Z8, and extends from the end 34 to the end 35, between the attachments 32 and 33. The stator 31 is received inside the rotor 30, i.e. the rotor 30 is arranged around the stator 31.

The rotor 30 rotates relative to the stator 31, around the axis Z8, when the drive 8 is electrically powered. i.e. when the rotor 30 and/or the stator 31 are electrically powered. The rotor and/or the stator 31 may include electromagnetic windings so that, when electrically powered, the rotor 30 is made to rotate relative to the stator 31, i.e. relative to the frame 5, by electromagnetic interaction between the rotor 30 and the stator 31.

The sliding of the mobile window 6 is substantially parallel to the longitudinal axis Z8, since it is parallel to the longitudinal direction Z5. Since the stator 31 is fixed relative to the frame 5, the window 6 slides relative to the stator 31. As visible in FIG. 5, in the open position of the window 6, the window 6 is positioned along the drive 8, i.e. the transversal edge 21 of the window 6 is positioned at the end 35 of the drive 8, the transversal edge 20 is positioned at the end 34 of the drive 8, the longitudinal edge 18 is positioned along the drive 8, and the longitudinal edge 19 is positioned opposite to the drive 8. As visible in FIGS. 1, 2 and 3, in the closed position, the window 6 is positioned past the drive 8 in the direction Z5, i.e. the transversal edge 21 of the window 6 is positioned past the end 35 in the direction Z5, the transversal edge 20 is positioned at the end 35 of the drive 8 and the longitudinal edge 18 is positioned past the drive 8 in the direction Z5.

Since the fixed window 7 is fixed relative to the frame 5, it is also fixed relative to the stator 31. The fixed window 7 is positioned along the first drive 8.

The mobile window 6 is driven between the open position and the closed position by the rotation of the rotor 30, via the first transmission mechanism 10. To this end, the transmission mechanism 11 preferably comprises a lead screw 40, a nut 41, a slider 42 and a sliding guide 43.

The lead screw 40 is centered on the axis Z8 and is arranged around the rotor 30, i.e. the rotor 30 is received inside the lead screw 40. The lead screw 40 is secured to the rotor 30, so that the lead screw 40 and the rotor 30 rotate together around the axis Z8 relative to the stator 31, when the drive 8 is powered. The lead screw 40 extends from the end 34 to the end 35 of the drive 8. The lead screw 40 is threaded outwardly.

The nut 41 is secured to the slider 42. The slider 42 is secured to the mobile window 6, so that the nut 41 is secured to the mobile window 6 via the slider 42. The nut 41 is geared with the lead screw 40 so that the slider 42 and the nut 41 are moved in translation along the axis Z8, between the ends 34 and 35, under rotation of the lead screw 40 caused by rotation of the rotor 30.

The sliding guide 43 is tubular shaped, centered on axis Z8 and extending from the end 34 to the end 35. The sliding guide 43 is fixedly attached to the frame 5 by the attachments 32 and 33, to be fixed relative to the frame 5 and the stator 31. The sliding guide 43 is arranged around the lead screw 40, thus enclosing the lead screw 40 and the rotor 30 and stator 31 contained therein. The sliding guide 43 comprises a longitudinal slot, extending from the end 34 to the end 35. The guide 43 receives the slider 42, which crosses said slot radially relative to the axis Z8. The slider 42, being received in the slot of the guide 43, is guided by the guide 43 along the axis Z8. Thus, the slider 42 and the nut 41 are prevented from rotating around the axis Z8. Thanks to this arrangement, the sliding of the window 6 is guided by the slider 42 and guide 43, and driven by the drive 8 through the lead screw 40 and nut 41.

The second drive 9 and transmission mechanism 11 may be, overall, similar to the first drive 8 and transmission mechanism 10, and positioned at an opposite side of the window assembly 3.

The second drive 9 is contained inside the second transmission mechanism 11. The second drive 9 and transmission mechanism 11 are contained in the pillar 15, opposite to the pillar 14 containing the first drive 8 and first transmission mechanism 10. As best visible in FIGS. 3-5, the second drive 9 comprises a second rotor 50, a second stator 51, a first attachment 52, a second attachment 53, a first longitudinal end 54 and a second longitudinal end 55. The second drive 9 defines a second longitudinal axis Z9, parallel to the longitudinal direction Z5 and fixed relative to the stator 51 and the frame 5.

The longitudinal end 54 is positioned at the beam 16 and the longitudinal end 55 is positioned at the beam 17. The fixed window 7 is positioned along the second drive 9, i.e. between the drives 8 and 9.

The second drive 9 may be an electric drive. The stator 51 has an elongated shape along the axis Z9, and extends from the end 54 to the end 55. The stator 51 is fixed relative to the frame 5, and is attached to the frame 5 at the first end 54, by the first attachment 52, and at the second end 55, by the second attachment 53. The first attachment 52 connects the stator 51 to a junction between the beam 16 and the pillar 15. The second attachment 53 connects the stator 51 to a junction between the beam 17 and the pillar 15.

The rotor 50 has a tubular shape centered on the axis Z9, and extends from the end 54 to the end 55, between the attachments 52 and 53. The stator 51 is received inside the rotor 50, i.e. the rotor 50 is arranged around the stator 31.

The rotor 50 rotates relative to the stator 51, around the axis Z8, when the drive 8 is electrically powered. i.e. when the rotor 50 and/or the stator 51 are electrically powered. The rotor 50 and/or the stator 51 may include electromagnetic windings so that, when electrically powered, the rotor 50 is made to rotate relative to the stator 51, i.e. relative to the frame 5, by electromagnetic interaction between the rotor 50 and the stator 51.

As visible in FIG. 5, in the open position of the window 6, the window 6 is positioned along the drive 9, in particular between the drives 8 and 9, i.e. the transversal edge 21 of the window 6 is positioned at the end 55 of the drive 9, the transversal edge 20 is positioned at the end 54 of the drive 9, the longitudinal edge 19 is positioned along the drive 9, and the longitudinal edge 18 is positioned opposite to the drive 9. As visible in FIGS. 1 and 3, in the closed position, the window 6 is positioned past the drive 9 in the direction Z5, i.e. the transversal edge 21 of the window 6 is positioned past the end 55 in the direction Z5, the transversal edge 20 is positioned at the end 55 of the drive 9 and the longitudinal edge 19 is positioned past the drive 9 in the direction Z5.

The mobile window 6 is driven between the open position and the closed position by the rotation of the rotor 50, via the second transmission mechanism 11. To this end, the transmission mechanism 11 preferably comprises a lead screw 60, a nut 61, a slider 62 and a sliding guide 63. Thus, the window 6 is driven under rotation of both rotors 30 and 50.

The lead screw 60 is centered on the axis Z9 and is arranged around the rotor 50, i.e. the rotor 50 is received inside the lead screw 60. The lead screw 60 is secured to the rotor 50, so that the lead screw 60 and the rotor 50 rotate together around the axis Z9 relative to the stator 51, when the drive 9 is powered. The lead screw 60 extends from the end 54 to the end 55 of the drive 9. The lead screw 60 is threaded outwardly.

The nut 61 is secured to the slider 62. The slider 62 is secured to the mobile window 6, so that the nut 61 is secured to the mobile window 6 via the slider 62. The nut 61 is geared with the lead screw 60 so that the slider 62 and the nut 61 are moved in translation along the axis Z9, between the ends 54 and 55, under rotation of the lead screw 60 caused by rotation of the rotor 50.

The sliding guide 63 is tubular shaped, centered on axis Z9 and extending from the end 54 to the end 55. The sliding guide 63 is fixedly attached to the frame 5 by the attachments 52 and 53, to be fixed relative to the frame 5 and the stator 51. The sliding guide 63 is arranged around the lead screw 60, thus enclosing the lead screw 60 and the rotor 50 and stator 51 contained therein. The sliding guide 63 comprises a longitudinal slot, extending from the end 54 to the end 55. The guide 63 receives the slider 62, which crosses said slot radially relative to the axis Z9. The slider 62, being received in the slot of the guide 63, is guided by the guide 63 along the axis Z9. Thus, the slider 62 and the nut 61 are prevented from rotating around the axis Z9. Thanks to this arrangement, the sliding of the window 6 is guided by both sliders 42 and 62, and driven by both drives 8 and 9, through the lead screws 40 and 60 and nuts 41 and 61.

In an alternative embodiment, the second drive 9, the nut 61 and the lead screw 60 are omitted, so that the window 6 is driven solely by the drive 8 via the transmission mechanism 10, and guided by the transmission mechanism 10 and the slider 62 and sliding guide 63.

In an alternative embodiment, a second mobile window, or another feature than a window, may be provided instead of the fixed window 7, taking advantage of the space available between the drives 8 and 9 if the two drives are implemented, or along the drive 8 if only drive 8 is implemented.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A window assembly for a vehicle, the window assembly comprising:
    a first drive comprising a first stator and a first rotor, wherein the first rotor is arranged around the first stator and rotates relative to the first stator about a first longitudinal axis fixed relative to the first stator when the first drive is electrically powered;
    a mobile window having a transversal edge and a first longitudinal edge, the mobile window being slidable relative to the first stator substantially parallel to the first longitudinal axis, between an open position where the transversal edge is positioned at a first longitudinal end of the first drive and the first longitudinal edge is positioned along the first drive, and a closed position where the transversal edge is positioned at a second longitudinal end of the first drive and where the first longitudinal edge is positioned past the first drive along the first longitudinal axis; and
    a first transmission mechanism, the mobile window being driven between the open position and the closed position by the rotation of the first rotor, via the first transmission mechanism.

2. The window assembly of claim 1, further comprising:
    a fixed window, fixed relative to the first stator and positioned along the first drive;
    wherein the mobile window is superposed with the fixed window when the mobile window is in the open position and wherein the mobile window is positioned past the fixed window when the mobile window is in the closed position.

3. The window assembly of claim 1, wherein the first drive comprises:
    a first attachment attaching the first stator to a frame of the window assembly, the mobile window being mobile relative to the frame between the closed and the open position, the first attachment being positioned at the first longitudinal end of the first drive; and
    a second attachment attaching the first stator to the frame, the second attachment being positioned at a second longitudinal end of the first drive, opposite to the first longitudinal end of the first drive, the first rotor being arranged between the first attachment and the second attachment.

4. The window assembly of claim 1, wherein the first transmission mechanism comprises:
    a lead screw arranged around the first rotor and secured to the first rotor; and
    a nut secured to the mobile window and geared with the lead screw.

5. The window assembly of claim 1, wherein the first transmission mechanism comprises a slider attached to the mobile window, and a sliding guide fixed relative to the first stator, the slider being guided by the sliding guide, guiding the sliding of the mobile window between the open position and the closed position.

6. The window assembly of claim 1, further comprising:
    a second drive comprising a second stator and a second rotor, wherein the second rotor is arranged around the second stator and rotates relative to the second stator about a second longitudinal axis fixed relative to the second stator and parallel to the first longitudinal axis when the second drive is electrically powered, the mobile window having a second longitudinal edge opposite to the first longitudinal edge, the transversal edge connecting the first longitudinal edge to the second longitudinal edge, the transversal edge being positioned at a first longitudinal end of the second drive when the mobile window is in the open position, the second longitudinal edge being positioned along the second drive when the mobile window is in the open position, the second longitudinal edge being positioned past the second drive along the second longitudinal axis when the mobile window is in the closed position; and
    a second transmission mechanism, the mobile window being driven between the open position and the closed position by rotation of the second rotor, via the second transmission mechanism, in addition to being driven by rotation of the first rotor.

7. A vehicle door comprising the window assembly of claim 1.

8. A vehicle comprising a cab, wherein the cab comprises the window assembly of claim 1.

9. The vehicle of claim 8, wherein the vehicle is a truck or bus.

* * * * *